United States Patent [19]

Goyert et al.

[11] 4,397,974

[45] Aug. 9, 1983

[54] LOW-HALOGEN-CONTENT, THERMOPLASTIC POLYURETHANE ELASTOMER HAVING IMPROVED FLAME RESISTANCE BY THE ADDITION OF A 4-COMPONENT ADDITIVE COMBINATION, ITS PRODUCTION AND ITS USE

[75] Inventors: Wilhelm Goyert; Wolfgang Fleige, both of Leverkusen; Hans-Georg Hoppe, Leichlingen; Hans Wagner, Dormagen, all of Fed. Rep. of Germany

[73] Assignee: Bayer Aktiengesellschaft, Leverkusen, Fed. Rep. of Germany

[21] Appl. No.: 363,165

[22] Filed: Mar. 29, 1982

[30] Foreign Application Priority Data

Apr. 2, 1982 [DE] Fed. Rep. of Germany ....... 3113385

[51] Int. Cl.³ .............................................. C08L 75/04
[52] U.S. Cl. .................................... 524/143; 524/140; 524/141; 524/156; 524/412; 524/437
[58] Field of Search ............... 524/140, 141, 143, 156, 524/412, 437

[56] References Cited

U.S. PATENT DOCUMENTS

| | | | |
|---|---|---|---|
| 3,833,535 | 9/1974 | Wambach | 260/40 R |
| 3,833,540 | 9/1974 | Anderson | 260/45.9 |
| 3,971,760 | 7/1976 | Anderson | 260/459 K |
| 4,028,336 | 6/1977 | Anderson | 260/45.7 |
| 4,094,869 | 6/1978 | Biranowski et al. | 260/2.5 AW |

FOREIGN PATENT DOCUMENTS 2901774 7/1980 Fed. Rep. of Germany.
1395780 5/1975 United Kingdom.

Primary Examiner—Lewis T. Jacobs
Attorney, Agent, or Firm—Gene Harsh; Joseph C. Gil; Richard A. Elder

[57] ABSTRACT

The present invention relates to low-halogen-content, thermoplastically-processible polyurethane elastomers (TPU), to which are added antimony trioxide, chlorinated and/or brominated aromatic compounds having a specified halogen content, aluminum hydroxide having a specified particle size, phosphoric acid tris-ester, and, optionally, quaternary tetra-alkyl ammonium salts. These additives impart an unexpectedly favorable combination of electrical surface properties, flameproof behavior and abrasion resistance.

10 Claims, No Drawings

LOW-HALOGEN-CONTENT, THERMOPLASTIC POLYURETHANE ELASTOMER HAVING IMPROVED FLAME RESISTANCE BY THE ADDITION OF A 4-COMPONENT ADDITIVE COMBINATION, ITS PRODUCTION AND ITS USE

BACKGROUND OF THE INVENTION

The present invention relates to low-halogen-content, thermoplastically processible polyurethane elastomers (TPU) to which a special 4-component additive mixture imparts an unexpectedly favorable combination of electrical surface properties, flameproof behavior and abrasion resistance.

It is known that a concentrate of antimony trioxide and brominated diphenyl ethers or polystyrene can be added to thermoplastic polyurethane elastomers (German Offenlegungsschrift No. 2,901,774). No examples of the flameproofing effect are given in this publication, nor is there any mention of phosphorous compounds and aluminum hydroxide.

In the case of polyurethane foams, examples of brominated phenoxy compounds and antimony trioxide are described in U.S. Pat. No. 3,971,760. Although aluminum hydroxide is mentioned, it is not a basic requirement for the flameproofing effect. The composition in question does not contain any chain-extending agents or phosphorus compounds.

Fire-retarding preparations based on phosphate esters and aluminum oxide trihydrate are described in German Offenlegungsschrift No. 2,263,005. Reference is made to a self-expanding polyurethane. Halogen compounds and antimony trioxide are not used. The abrasion resistance of the products is unfavorable.

The combination of silicon dioxide, antimony trioxide, bromine and phosphorus compounds has been described in connection with linear polyesters (German Offenlegungsschrift No. 2,242,509). Finely divided silicon dioxide in a quantity of from 5 to 12% by weight and preferably 5% by weight is essential to the disclosed effect, but reduces the abrasion resistance (and other strength properties) of the resultant polyurethane elastomers. This known combination does not contain the important synergist aluminum hydroxide.

None of these products is capable of being used to provide a thermoplastic polyurethane elastomer in such a way that a material produced therefrom has the particular combination of properties, such as high strength, good abrasion resistance, high tear propagation resistance, high flame resistance, stipulated by various standards, for example VDE 0472, coupled with improved electrical surface properties.

DESCRIPTION OF THE INVENTION

It has now surprisingly been found that even very low-halogen-content, thermoplastic polyurethane elastomers having improved flameproof, electrical surface conductivity and abrasion properties can be produced by the process according to the present invention which is characterized in that
(A) from 2.5 to 24% by weight (preferably from 5 to 10% by weight) of a combination of additives, said additives being present in an amount of
(B) from 1 to 10% by weight (preferably from 3 to 6% by weight) of antimony trioxide,
(C) from 0.3 to 6% by weight (preferably from 0.5 to 2% by weight) of chlorinated and/or brominated aromatic compounds having a halogen content of from 50 and 88% by weight (preferably from 58 to 75% by weight),
(D) from 1 to 8% by weight (preferably from 1.5 to 4% by weight) of aluminum hydroxide having a particle size of from 0.1 to 100μ (preferably from 2 to 40μ),
(E) from 0.2 to 4% by weight (preferably from 0.3 to 1% by weight) of phosphoric acid tris-ester (preferably aromatic phosphoric acid tris-ester) and optionally
(F) up to 5% by weight of quaternary tetra-alkyl ammonium salts (all of said percents by weight being based on the total weight of the additives and said thermoplastic polyurethane)
is incorporated in the thermoplastic polyurethane elastomer and/or added in the form of a concentrate to and mixed with the thermoplastic polyurethane before, during or after the polyurethane-forming reaction.

The invention also relates to low-halogen-content, thermoplastic polyurethane elastomers containing flameproofing agents and fillers and having improved flame resistance, electrical surface properties, abrasion resistance and thermal stability under load, comprising
(A) from 97.5 to 76% by weight (preferably from 95 to 85% by weight) of a thermoplastic polyurethane elastomer optionally containing light stabilizers, oxidation inhibitors and/or UV-absorbers, from 2.5 to 24% by weight (preferably from 5 to 10% by weight) of components (B) to (F), said components (B) through (F) being present in the following amounts:
(B) from 1 to 10% by weight (and preferably from 3 to 6% by weight) of antimony trioxide,
(C) from 0.3 to 6% by weight (and preferably from 0.5 to 2% by weight) of chlorinated and/or brominated compounds having a halogen content of from 50 to 88% by weight (and preferably from 58 to 75% by weight),
(D) from 1 to 8% by weight (and preferably from 1.5 to 4% by weight) of aluminum hydroxide having a particle size of from 0.1 to 100μ (and preferably from 2 to 40μ),
(E) from 0.2 to 4% by weight or phosphoric acid tris-esters and preferably from 0.3 to 1% by weight of aromatic phosphoric acid tris-esters and, optionally,
(F) up to 5% by weight of quaternary tetra-alkyl ammonium salts, (all of said percents by weight being based on the total amount of components (A) through (F).

The present invention also relates to the use of the thermoplastic polyurethanes produced in accordance with the invention for injection-molding, extruding, calendering and film-blowing for the production of moldings, cable sheaths and films.

The additives according to the invention improve the electrical surface properties of the materials in regard to surface resistance (lower) and dielectric strength (higher). The thermal properties are modified to the extent that thermal stability under load is—as required—relatively high. The flameproof requirements stipulated in the Test Standard VDE 0472 are satisfied (despite the fact that only relatively little halogen is present in the materials, which may be explained by a synergistic effect of this additive combination which is new to thermoplastic polyurethane elastomers).

Abrasion resistance also remains intact despite the number of additives.

The thermoplastic polyurethane elastomers are generally of the type known and used in the prior art. They are synthesized from long-chain polyols having molecular weights of from 400 to 10,000, polyisocyanates, preferably diisocyanates, and chain-extending agents having molecular weights of up to 399 (preferably short-chain polyols having molecular weights of up to 380), the equivalent ratio of isocyanate groups to Zerewitinoff-active H-atoms (referred to hereinafter as the NCO/OH ratio) preferably amounting to between 0.90 and 1.10 and, more preferably, to between 0.98 and 1.04.

According to the invention, suitable substantially linear polyols having molecular weights in the range from 400 to 10,000 and preferably in the range from 800 to 6000 include virtually any polyesters, polylactones, polyethers, polythioethers, polyester amides, polycarbonates and polyacetals generally known containing preferably two or—in small quantities—even three Zerewitinoff-active groups (preferably hydroxyl groups), and also vinyl polymers, such as polybutadiene diols. Also, useful are polyhydroxyl compounds already containing urethane or urea groups, optionally modified natural polyols and other compounds containing Zerewitinoff-active groups, such as amino, carboxyl or thiol groups. These compounds correspond to the prior art and are described for example in German Offenlegungsschriften Nos. 2,302,564; 2,423,764; and 2,549,372 (U.S. Pat. No. 3,963,679), in German Offenlegungsschrift No. 2,497,387 (U.S. Pat. No. 4,035,213) and in German Offenlegungsschrift No. 2,854,384.

According to the invention, it is preferred to use hydroxyl-group-containing polyesters of dialcohols and adipic acid, polycarbonates, polycaprolactones, polyethylene oxide-, polypropylene oxide-, polytetrahydrofuran-polyethers and mixed polyethers of ethylene oxide and propylene oxide and, optionally, tetrahydrofuran. Mixtures of polypropylene glycol ethers (or even copolyether derivatives thereof with ethylene oxide) and adipic acid diol esters (particularly adipic acid-$C_4$-$C_6$-diol polyesters or polycarbonate diols, especially hexane diol polycarbonates) are particularly preferred. Thermoplastic polyurethane elastomers on this basis in conjunction with the additives mentioned above are distinguished not only by the above-described advantages, but also by improved microbial resistance and also by improved strength.

Diisocyanates suitable for use in accordance with the invention are the aliphatic, cycloaliphatic, araliphatic, aromatic and heterocyclic diisocyanates generally known and of the type described for example in German Offenlegungsschriften Nos. 2,302,564; 2,423,764; 2,549,372; 2,402,840; 2,457,387 and 2,854,384 to which reference has already been made. Diisocyanates preferably used in accordance with the invention are hexamethylene diisocyanate, isophorone diisocyanate, naphthylene-1,5-diisocyanate, tolylene diisocyanates and the diphenyl methane diisocyanate isomers. 4,4'-diisocyanato-diphenyl methane is particularly preferred.

The diisocyanates mentioned may optionally be used in conjunction with up to about 15 mole percent (based on diisocyanate) of a higher polyisocyanate. However, the quantity in which the higher polyisocyanate is used has to be limited in such a way that a still fusible or thermoplastic product is obtained. The effect of a relatively large quantity of higher isocyanates should generally be counteracted by using on average, less than difunctional hydroxyl or amino compounds (or even monoisocyanates), so that excessive chemical crosslinking of the product is avoided. Examples of higher isocyanates and monofunctional compounds may again be found in the prior art literature cited above. Monoamines, such as butyl and dibutylamine, hydroxylamine, stearylamine, N-methyl stearylamine, pyrrolidine, piperidine and cyclohexylamine, and monoalcohols, such as 1-butanol, 2-ethyl-1-hexanol, 1-dodecanol, cyclohexanol and ethylene glycol monomethyl ether are mentioned by way of example.

The chain-extending agents used in accordance with the invention are also generally known and are described for example in the Offenlegungsschriften cited earlier in reference to the diisocyanates. The chain-extending agents in question are low molecular weight polyalcohols, preferably diols, polyamines, hydrazines and hydrazide derivatives. Aminoalcohols such as ethanolamine, diethanolamine, n-methyl diethanolamine, 3-aminopropanol, hydrazine or carbodihydrazide may also be used in accordance with the invention. Preferred chain-extending agents are diols such as, for example, ethylene glycol, di- and tri-ethylene glycol, and especially 1,6-hexane diol and hydroquinone di-$\beta$-hydroxyethyl ether. In the majority of cases, it is preferred to use 1,4-butane diol.

The products according to the invention generally have a Shore hardness range of from 70 A to approximately 60 D and, more particularly, from 80 A to 92 A. This corresponds to a molar ratio of long-chain polyol (relatively high molecular weight polyhydroxyl compound) to chain-extending agent (preferably difunctional compounds having a molecular weight of up to 399) of from about 1:1.5 to 1:8 and preferably from 1:2 to 1:5.

The usual hydrolysis and oxidation stabilizers known in the prior art may of course be added to the polyurethane components. It is advisable additionally to add oxidation inhibitors, such as 2,6-di-tert.-butyl-4-methyl phenol, other sterically hindered phenols and/or organic phosphites and/or phosphonites and/or other standard oxidation inhibitors either individually or in admixture in a quantity of from about 0.1 to 1.5% by weight, based on TPU, for stabilizing the polyurethane. UV-absorbers and light stabilizers based on benztriazole, 2,2,6,6-tetramethyl piperidine, 1,2,2,6,6-pentamethyl piperidine or benzophenone and other UV-absorbers may also be added to the TPU. The hydrolysis stabilizers are normally based on carbodiimides, ureas, cyanates or oxazolidines.

Approximately 1 to 10% by weight and preferably 3 to 6% by weight of antimony compounds are added to the claimed thermoplastic polyurethane. Finely ground antimony trioxide ($Sb_2O_3$) is preferably used.

Halogen compounds need only be added in very small quantities (from 0.3 to 6% by weight and preferably from 0.5 to 2% by weight) to the combination according to the invention to achieve the required flameproofing effect. As a result, noxious hydrogen halides are only in evidence on a very reduced scale upon combustion of the corresponding (low-halogen-content) finished TPU.

Suitable halogen compounds include chlorinated and/or brominated compounds containing from 50 to 88% by weight and preferably from 58 to 75% by weight of halogen. Suitable materials include, for example, Dechlorane-604 and Dechlorane-510, both products of Hooker Chemicals, Niagara Falls/USA. The halogen compounds should show adequate thermal stability at the temperature at which the thermoplastic polyurethanes are processed which is generally in the range from about 220° to 250° C. It is preferred to use aromatic bromine compounds, such as for example, pentabromine toluene, hexabromine benzene, and especially aromatic bromine compounds of low volatility, such as tetrabromo-4,4'-dihydroxy phenyl dimethyl methane, brominated diphenyl ethers containing approximately 67 to 71% by weight of bromine (mixtures containing pentabromodiphenyl ether as their main constituent), more highly brominated diphenyl ethers, such as decabromodiphenyl ether (82 to 83% by weight of bromine), brominated polyphenyl ethers, and the like. Pentabromodiphenyl ether is particularly preferred.

Aluminum hydroxide is used in a particle size of from 0.1 to 100μ and preferably in a particle size of from 2 to 40μ and in quantities of from 1 to 8% by weight and preferably in quantities of from 1.5 to 4% by weight. At least 65% by weight of aluminum hydroxide ($Al(OH)_3$) consists of $Al_2O_3$. The aluminum hydroxide still contains approximately 2 to 3 moles of (bound) water and is capable of giving off water at temperatures above 200° C. Martinal BM/2, a product of Matinswerk GmbH, Bergheim/Erft, Federal Republic of Germany, was used in the Examples. By virtue of this small amount of inorganic filler, the "classical" properties of thermoplastic polyurethane elastomers, such as abrasion resistance and tear propagation resistance, are hardly affected and are still at a high level.

Phosphorus compounds suitable for use in accordance with the invention include phosphoric acid tris-esters which are thermally stable at the temperature at which the thermoplastic elastomers are processed (typically above 200° C. and preferably above 240° C.). Specific materials include, for example, aliphatic phosphates, such as trioctyl phosphate and tridodecyl phosphate; araliphatic phosphoric acid esters, such as diphenyl dodecyl phosphate; and, preferably, aromatic phosphates, such as for example triphenyl phosphate and most preferedly, diphenyl cresyl phosphate. The quantities added are relatively small (0.2 to 4% by weight and preferably 0.3 to 1% by weight). By virtue of this, the thermoplastic polyurethanes retain their favorable properties, such as resistance to oils and high mechanical strengths and, in addition, have the other advantages according to the invention, as described above, in synergistic admixture.

From 0 to 5% by weight of quaternary ammonium compounds, such as tetra-alkyl ammonium methyl sulfate (marketed as "Catafor CA 100" by Langer & Co., 2863 Ritterhude/Bremen, PO Box 1, Federal Republic of Germany) may optionally be added to the thermoplastic polyurethanes stabilized in accordance with the invention. An addition of approximately 2% by weight adjusts surface resistance in particular to favorably low values of $\leq 2 \times 10^9$ ohms. At the same time, the flameproof properties are improved. Other possible additives for reducing static charging include, for example, carbon black, graphite powder, carbon fibers, metal oxides such as copper oxides, metal powders such as copper or aluminum powder. Antistatic agents, for example based on acrylic sulfonates, may also be added. The quaternary ammonium compounds and the other solid additives, such as carbon black or metal powders, are preferably reacted with the reacting polyurethane constituents in a twin-screw kneader.

The thermoplastic polyurethanes modified in accordance with the invention have a number of advantages. The relatively small quantities of synergistically acting additives, preferably amounting in all to about 5 to 15% by weight, improve the properties of the polyurethanes in many respects. Their electrical properties, such as surface resistance and dielectric strength, are modified (reduced and increased, respectively). Sheathed cables for example satisfy the requirements of VDE 0472 in regard to flameproof properties. The thermoplastic polyurethanes modified in accordance with the invention also pass the cable conductor tests (cf. Examples). The thermal stability under load of these new thermoplastic polyurethanes is relatively high. Their abrasion resistance according to DIN 53 516 is more favorable than that of most types of PVC and rubber. Tensile strength and tear propagation resistance are both high.

The materials according to the invention are used in particular for applications requiring flameproofed products having partly improved electrical properties, preferably for the sheathing of cables, for housings of various types, for hoses and conveyor belts, particularly of the type used in mining, for coachwork components or moldings, for rollers and the like. The new materials may be injection-molded, extruded and transformed by any of the other methods normally used for processing thermoplasts. Films may be produced by calendering or blowing techniques.

The polyurethane-forming reaction may be carried out after the casting process or by reaction in a reaction screw and is described accordingly in the Examples.

Additives (B) to (F) may be added either individually or in admixture before and/or during and/or after the polyurethane-forming reaction. They are preferably incorporated in the form of an additive concentrate. The concentrate of the individual additive components may be produced beforehand in a thermoplast, such as an ABS-polymer, polycarbonate, ethylene vinyl acetate or PVC. Preferred polar thermoplasts for this purpose are described for example in German Offenlegungsschrift No. 2,854,409. However, it is preferred to use a concentrate in a polyurethane elastomer containing the additives in quantities of from 25 to 75% by weight and preferably in quantities of 40 to 70% by weight.

The polyurethane reactions in a twin-screw kneading-type extruder (Examples 1 and 2) are carried out by the processes described in German Pat. Nos. 813,154; 862,668 and 940,109, in German Offenlegungsschrift No. 2,302,564 (U.S. Pat. No. 3,963,679) and in U.S. Pat. Nos. 3,233,025 and 3,642,964. The residence times of the reaction melt in the screw extruder generally amount to between 0.3 and 30 minutes and preferably to between 0.5 and 4 minutes. The temperature of the extruder barrel is between about 60° and 300° C. (approximately 80° to 280° C. in the feed zone; approximately 100° to 250° C. in the middle of the extruder and approximately 60° to 210° C. in the discharge zone). The melt issuing from the extruder is quenched and size-reduced by methods generally known in the art. The products of the process may be thermoplastically processed in the usual way to form films, cable sheaths, seals, moldings, such as gear wheels, and the like. The mixture of the polyurethane-forming components with the additives may also be processed into moldings immediately after the reaction in the screw extruder.

The invention is illustrated by the following Examples. Unless otherwise stated, quantities are expressed in percentages by weight. A twin-screw kneading-type extruder of the ZSK 53 V type manufactured by Werner & Pfleiderer, Stuttgart, with a self-cleaning screw arrangement is used in Examples 2 and 3. The length of the processing section corresponds to approximately 42 times the screw diameter the same screw trim (an arrangement of screw and kneading elements of which approximately 20% consists of kneading elements) is used for all the Examples. The processing section consists of 12 housings, the first of which is provided with a feed hopper for the thermoplast or the starting materials. The mode of operation of the screw extruder and of the kneading and transporting elements of the screw trim is described in detail in brochures issued by Werner and Pfleiderer and in German Offenlegungsschrift No. 2 302 564. It is preferred to use temperatures $\leq 200°$ C., most preferably $\leq 195°$ C., on extrusion or injection molding processes.

In the VDE-tests (DIN 57472/Part 804; VDE 0472/1154, paragraph 37; IEEE 332) the conducting wires embedded towards the centre of the cable have been coated with PVC in all cases. Herewith it is in general sufficient to use only up to 4% of halogenated or brominated compounds (C) in the additive combination of the coating. If embeddings of the conducting wires are used, which are free of halogen, e.g. polyethylene or EPDM-polymers, then the content of halogenated or brominated compounds (C) in the additive combination of the coating has to be increased up to 6% by weight.

EXAMPLES

The flameproofed thermoplastic polyurethane elastomers may be produced either directly or via the intermediate stage of an additive concentrate using a twin-screw kneading-type extruder (Werner & Pfleiderer type ZSK 53). They may also be produced by casting.

1. Casting (in a single stage)

(A) A mixture of:

| | |
|---|---|
| 62.89 | parts of 1,4-butane diol adipic acid polyester; molecular weight 2000 (OH number 56), |
| 0.25 | part of stearyl amide (lubricant for the production of PU), |
| 6.30 | parts of 1,4-butane diol |
| 3.41 | parts of antimony trioxide |
| 0.58 | part of pentabromodiphenyl ether |
| 1.70 | parts of aluminum oxide hydrate (= aluminum hydroxide) |
| 0.34 | part of diphenyl cresyl phosphate |

[(1)four-component mixture 6.03% by weight]

is heated with stirring to 80° C. in a reaction vessel.

24.53 parts of 4,4'-diisocyanatodiphenylmethane (MDI) heated to 60° C. are then added with stirring. The NCO/OH equivalent ratio is 1.01. After stirring for 20 minutes, the reaction mixture is poured into a Teflon-lined trough heated to 80°–100° C. and heated for about 1 hour. The approximately 1 cm thick rough sheet is then cut into strips and granulated. The polyurethane content of the elastomer amounts to 93.97% by weight.

As mentioned above, the antimony trioxide is preferably used in the form of a fine powder. The aluminum oxide hydrate is also used in the form of a fine powder (Martinal ® BM-2, a product of Martinswerk, GmbH, D-5010 Bergheim, Federal Republic of Germany).

After storage for 2 days, injection-molding or extrusion and tempering of the moldings for 15 hours at 80° C., the granulate shows the following properties:

| | Standard | | Unit of Measurement |
|---|---|---|---|
| Tensile strength | DIN 53504 | 43 | MPa |
| Breaking elongation | DIN 53504 | 650 | % |
| Abrasion loss | DIN 53516 | 55 | mm$^3$ |
| Shore A hardness | DIN 53505 | 83 | |
| Surface resistance | DIN 53482 | $6.6 \cdot 10^{10}$ | $\Omega$ |
| Volume resistance | DIN 53482 | $2.3 \cdot 10^{10}$ | $\Omega$ cm |
| Dielectric strength | DIN 53481 | 18.9 | KV/mm |
| UL-94 test After flame time UL-94-HB-test | UL 94 | 1 | s |
| Char length Grading: | | 15 UL-94 V-0 | |
| VDE-test** | DIN 57472 Part 804, Test Method A | passed | |
| After-flame time | | 0 | s |
| Char length | | 10 | mm |

**explained after point 3

In addition, the following formulations, in which the quantities of additives are varied, were made up in accordance with the invention and tested. Production was carried out in the same way as described in Example 1(A).

| Test No. | PUR (parts) | Antimony trioxide (parts) | Penta-bromodi-phenyl ether (parts) | Aluminum oxide hydrate (parts) | Diphenyl-cresyl phosphate (parts) |
|---|---|---|---|---|---|
| 1B | 93.61 | 3.61 | 0.61 | 1.81 | 0.36 |
| 1C | 92.33 | 4.33 | 0.74 | 2.17 | 0.43 |
| 1D | 90.79 | 4.35 | 1.39 | 2.90 | 0.57 |
| 1E | 90.55 | 2.77 | 1.99 | 4.15 | 0.54 |
| 1F | 90.36 | 1.34 | 2.41 | 5.36 | 0.53 |
| 1G | 90.06 | 2.54 | 1.83 | 5.07 | 0.50 |
| 1H | 89.97 | 6.21 | 0.84 | 2.49 | 0.49 |

All the variants mentioned pass the VDE flame test and also the UL-94-test (rating V-0; in some cases V-2). The mechanical properties are substantially the same as in test 1(A).

The following are included among the comparisons which do not correspond to the invention:
I. mixtures without any additives (flameproofing agents)=pure PUR
K. mixtures with the two-component combination of aluminum oxide hydrate ("aluminum hydroxide") (8 parts by weight) and diphenyl cresyl phosphate (1.6 parts by weight)
L. mixtures with the two-component combination of pentabromodiphenyl ether (2.25 parts by weight) and antimony trioxide (1.6 parts by weight).

The above mixtures I, K and L do not satisfy the requirements of the VDE Standard 0472 as cable sheathing materials.

2. Direct incorporation of the additives using a twin-screw kneader (ZSK 53)

(A) 6.21 parts of antimony trioxide and 2.49 parts of aluminum oxide hydrate are respectively introduced into the hopper of the extruder through a twin-screw metering unit. In addition, 0.84 part of pentabromodiphenyl ether and 0.49 part of diphenyl cresyl phosphate are respectively introduced into the hopper through a gear metering pump.

A semiprepolymer produced beforehand by reacting 29.17 parts of polypropylene glycol ether (molecular weight approximately 2200; OH-number 50) with 24.80 parts of 4,4'-diisocyanato-diphenyl methane for 1 to 2 hours at around 80° to 100° C. in the presence of 0.12 part of Ionol, is introduced into the housing 2. In addition, a solution of 0.29 part of stearyl amide in 29.17 parts of 1,4-butane diol/adipic acid polyester (molecular weight approximately 2000, OH-number 56) and 6.42 parts of 1,4-butane diol are introduced into the housing 2, the overall ratio of NCO/OH-groups amounting to 1.01. The chain extending agent and the flameproofing agent are introduced at room temperature. The following housing or barrel temperatures are adjusted along the extruder:

| Housing | 1 | 3 | 5 | 7 | 9 | 11 | 12 | Head |
|---|---|---|---|---|---|---|---|---|
| Temperature | 100 | 180 | 180 | 180 | 130 | 100 | 80 | 190° C. |

After storage for 2 days, injection-molding or extrusion and tempering for 15 hours at 80° C., the polyurethane thermoplast obtained has the following properties:

|  | Standard | | Unit of measurement |
|---|---|---|---|
| Tensile strength | DIN 53504 | 30 | MPa |
| Breaking elongation | DIN 53504 | 682 | % |
| Abrasion loss | DIN 53516 | 99 | mm$^3$ |
| Shore A hardness | DIN 53505 | 81 |  |
| Surface resistance | DIN 53482 | $5 \cdot 10^{11}$ | $\Omega$ |
| Volume resistance | DIN 53482 | $3.9 \cdot 10^{11}$ | $\Omega$ cm |
| Dielectric strength | DIN 53481 | 21.06 | KV/mm |
| UL-94-test |  |  |  |
| After-flame time |  | 4 | s |
| UL-94-HB-test | UL-94 |  |  |
| Char length |  | 58 | mm |
| Grading: |  | UL-94 V-2 |  |
| VDE-test** | Din 57472 Part 804, Test Method A | passed |  |
| After-flame time |  | 71 | s |
| Char length |  | 13 | mm |

Other combinations were also tested by this direct process:

| Test No. | PUR (parts) | Antimony trioxide (parts) | Pentabromodiphenyl ether (parts) | Aluminum oxide hydrate (parts) | Diphenyl cresyl phosphate (parts) |
|---|---|---|---|---|---|
| 2B | 90.79 | 4.35 | 1.39 | 2.90 | 0.57 |
| 2C | 90.55 | 2.77 | 1.99 | 4.15 | 0.54 |
| 2D | 92.26 | 1.28 | 0.89 | 5.08 | 0.49 |
| 2E | 91.86 | 2.37 | 1.73 | 3.55 | 0.49 |
| 2F | 93.28 | 2.91 | 2.08 | 1.43 | 0.30 |
| 2G | 94.19 | 3.25 | 0.56 | 1.68 | 0.32 |
| 2H | 92.74 | 0.59 | 1.68 | 4.74 | 0.25 |
| 2I | 94.12 | 0.59 | 0.40 | 4.64 | 0.25 |

The mechanical properties and the result of the flame test for Examples 2B to 2G according to the invention and for Comparison Tests H/I, which do not correspond to the combination according to the invention, are set out in the following Table:

| Test No. | 2B | 2C | 2D | 2E | 2F | 2G | 2H | 2I |
|---|---|---|---|---|---|---|---|---|
| Tensile strength (MPa) | 31.7 | 25.6 | 21.7 | 20.8 | 23.1 | 21.1 | 8.81 | 12.4 |
| Breaking elongation (%) | 627 | 726 | 592 | 595 | 610 | 570 | 490 | 627 |
| Abrasion | 39 | 166 | 143 | 161 | 130 | 134 | 290 | 236 |
| Shore A hardness | 82 | 83 | 84 | 85 | 85 | 85 | 85 | 84 |
| UL-94 test | V-2 | V-2 | V-2 | V-2 | V-2 | V-2 | V-2 | V-2 |
| VDE test | P* | P | P | P | P | P | not P | not P |

*P = passed

3. Production of an additive concentrate based on a soft ester using a twin-screw kneader (A) The additives antimony trioxide, aluminum oxide hydrate, pentabromodiphenyl ether and diphenyl cresyl phosphate are introduced into the hopper of the screw extruder in the same way as described in (2). The PUR starting materials are pumped into housing 2. The temperatures of the bromine compound and the ester are 100° C. The MDI is introduced into the machine at 60° C. All the other components are at room temperature. The formulation for the mixture according to the invention is as follows (in parts by weight):

introduced into the hopper:
31.47 parts of antimony trioxide
15.73 parts of aluminum oxide hydrate
5.35 parts of pentabromodiphenyl ether
3.15 parts diphenyl cresyl phosphate
introduced in housing 2:
31.47 parts of 1,4-butane diol/adipic acid polyester; molecular weight 2000 (OH number 56)
0.13 part of stearyl amide
10.34 parts of 4,4'-diisocyanato-diphenylmethane (MDI)
2.36 parts of 1,4-butane diol (NCO/OH=1.01).

The following temperatures are adjusted along the extruder:

| Housing | 1 | 3 | 5 | 7 | 9 | 11 | 12 | Head |
|---|---|---|---|---|---|---|---|---|
| Temperature | 100 | 130 | 130 | 130 | 90 | 80 | 75 | 190° C. |

After tempering for 15 hours at 80° C. and storage for 2 days, this granulate may be added to a variety of different types of PUR.

In order to meet the requirements of the flameproofing standards, the additive granulate has to be added in a quantity of 15% by weight.

The following test data applied to a mixture of 85% of the polyurethane of test 1 (no flameproofng agent) and 85% of the polyurethane of test 2 (no flameproofing agent) with a 15% addition of the flameproofing batch (F-batch).

|  | Standard | 3B 15% of F-batch 85% of PUR of test 1 | 3C 15% of F-batch 85% of PUR of test 2 | Unit of measurement |
|---|---|---|---|---|
| Tensile strength | DIN 53504 | 43.7 | 25.9 | MPa |
| Breaking elongation | DIN 53504 | 654 | 726 | % |
| Abrasion loss | DIN 53516 | 55 | 132 | mm$^3$ |

-continued

|  | Standard | 3B<br>15% of F-batch<br>85% of PUR of test 1 | 3C<br>15% of F-batch<br>85% of PUR of test 2 | Unit of measurement |
|---|---|---|---|---|
| Shore A hardness | DIN 53505 | 83 | 84 |  |
| Surface resistance | DIN 53482 | $5.4 \times 10^{11}$ | $5.6 \times 10^{11}$ | $\Omega$ |
| Volume resistance | DIN 53482 | $2.3 \times 10^{10}$ | $3.9 \times 10^{11}$ | $\Omega$ cm |
| Dielectric | DIN 53481 | 18.7 | 1.0 | KV/mm |
| UL-94-test |  |  |  |  |
| After-flame time |  | 1 | 0 | s |
| UL-94-HB-test | UL94 |  |  |  |
| Char length |  | 15 | 10 | mm |
| Grading: |  | V-0 | V-2 |  |
| VDE-test** | DIN 57472/Part 804<br>Test Method A |  |  |  |
| After-flame time |  | 0 | 0 | s |
| Char length |  | 10 | 10 | mm |
| VDE-test*** | DIN 57472/Part 804<br>Test Method C |  |  |  |
| After-flame time |  | — | — | s |
| Char length |  | — | — | mm |

,*explained after point 3

3% of tetra-alkyl ammonium ethyl sulfate (Catafor ® CA 100, a product of Langer and Co., 2863 Ritterhude/Bremen), which were introduced through the butane diol adipate during production of the polyurethane of test 2 (no flameproofing agent), reduce surface resistance to $2 \times 10^9$ ohms.

The following additive-granulate-concentrates according to the invention were produced under the same conditions as in 3(A):

| Test No. | PUR (parts) | Antimony trioxide (parts) | Pentabromodiphenyl ether (parts) | Aluminum oxide hydrate (parts) | Diphenyl cresyl phosphate (parts) |
|---|---|---|---|---|---|
| 3D | 43.87 | 10.97 | 7.89 | 32.89 | 4.38 |
| 3E | 40.65 | 20.33 | 14.63 | 20.33 | 4.06 |
| 3F | 33.54 | 25.18 | 21.14 | 16.76 | 3.30 |
| 3G | 37.18 | 37.17 | 3.34 | 18.59 | 3.72 |
| 3H | 35.12 | 26.34 | 17.47 | 17.56 | 3.51 |
| 3I | 33.78 | 33.79 | 12.16 | 16.89 | 3.38 |
| 3J | 31.86 | 23.88 | 17.20 | 23.88 | 3.18 |

All the granulate concentrates were mixed with the TPU of test 2 (no flameproofing agent) in a ratio of 15:85, extruded around cables and injection-molded into plate form.

The following test results were obtained:

| Test | 3D | 3E | 3F | 3G | 3H | 3I | 3J |
|---|---|---|---|---|---|---|---|
| Tensile strength (MPa) | 24.9 | 27.0 | 33.6 | 34.3 | 35.1 | 33.3 | 32.3 |
| Breaking elongation (%) | 645 | 582 | 615 | 645 | 611 | 528 | 602 |
| Abrasion | 123 | 74 | 78 | 107 | 85 | 91 | 91 |
| Shore A Hardness | 83 | 82 | 83 | 83 | 82 | 82 | 83 |
| VDE test, passed | yes | yes | yes | yes | yes | yes | yes |
| After-flame time(s) | 33 | 78 | 18 | 31 | 40 | 78 | 42 |
| Char length (mm) Mo-2332 | 10 | 12 | 10 | 15 | 10 | 12 | 10 |

It can clearly be seen that the four-component combination according to the invention provides a good and adequate flameproofing effect for the cable industry. The mechanical properties are only slightly different from those of the same products without a flameproof finish.

EXPLANATION OF THE TESTS (**) VDE-test (DIN 57472/Part 804—VDE 0472/11,54 §37; IEEE 332)

A 600 mm long piece of cable is vertically suspended in a metal box measuring 1200 mm (height) by 300 mm (width) by 450 mm (depth). The test specimen is ignited by means of a propane gas burner. The burner is adjusted in such a way that the total length of the flame amounts to approximately 175 mm and the length of the cone-shaped core to approximately 55 mm. The gas burner is fixed in such a way that its axis is inclined at an angle of 45° to the horizontal. The tip of the cone-shaped core is intended to be at a distance of about 10 mm from the surface and at a distance of about 100 mm from the lower end of the test specimen.

The flame application time is determined in accordance with the following formula:

$$t(s) = 60 + \frac{\text{weight of the specimen (g)}}{25}.$$

The test specimen passes the test if it does not burn or if any flames formed go out on their own after the flame application time and if the fire damage situated furthest away from the flame application point has not reached the upper end of the test specimen.

(***) VDE-test (DIN 57472/Part 804, test method C; IEEE 383; SS 424 14 75)

In this flame test, a ladder-like test frame is fixed with cables in a furnace measuring 4 meters (height) by 1 meter (width) by 2 meters (depth). The test frame has a width of 420 mm. The test specimens are fixed to the test ladder at intervals of half the cable diameter.

Before the beginning of the test, the 340 mm wide flat burner is adjusted with a mixture of propane gas and air in such a way that the energy input amounts to 75 MJ/h. The flow rate of the ambient air at the top of the furnace should not exceed 8 m/s.

The burner is arranged horizontally at a distance of 75 mm from the surface and at a distance of 600 mm from the lower end of the test specimens.

The flame application time is 20 minutes.

The test specimens pass the test if any flames formed go out on their own or if the fire damage situated furthest away from the flame application point has not reached the upper end of the test specimens.

What is claimed is:

1. A process for the production of a low-halogen-content thermoplastic polyurethane elastomer having improved flame resistance, electrical surface properties and abrasion resistance by the addition of flameproofing agents and fillers, characterized in that
   (A) from 2.5 to 24% by weight of a combination of additives are incorporated into a thermoplastic polyurethane elastomer, said additives being present in amounts of
   (B) from 1 to 10% by weight of antimony trioxide,
   (C) from 0.3 to 6% by weight of chlorinated or brominated compounds having a halogen content of from 50 to 88% by weight,
   (D) from 1 to 8% by weight of aluminum hydroxide having a particle size of from 0.1 to 100μ,
   (E) from 0.2 to 4% by weight of phosphoric acid tris-ester and,
   (F) up to 5% by weight of quaternary tetra-alkyl ammonium salts, all of said percents being based on the total weight of the elastomer and additives, are added to the thermoplastic polyurethane elastomer before, during or after the polyurethane-forming reaction.

2. A thermoplastic polyurethane elastomer containing flameproofing agents and fillers and having improved flameproof, electrical surface and abrasion properties, comprising
   (A) from 97.5 to 76% by weight of a thermoplastic polyurethane optionally containing light stabilizers, oxidation inhibitors and UV-absorbers, from 2.5 to 24% by weight of additive components (B) to (F) in quantitative proportions of
   (B) from 1to 10% by weight of antimony trioxide,
   (C) from 0.3 to 6% by weight of chlorinated and/or brominated compounds having a halogen content of from 50 to 88% by weight,
   (D) from 1 to 8% by weight of aluminum hydroxide having a particle size of from 0.1 to 100μ,
   (E) from 0.2 to 4% by weight of phosphoric acid tris-ester and, optionally,
   (F) up to 5% by weight of quaternary tetra-alkyl ammonium salts.

3. Polyurethane elastomers as claimed in claim 2, characterized in that from 3 to 6% by weight of antimony trioxide are used.

4. Polyurethane elastomers as claimed in claim 2, characterized in that brominated aromatic compounds having a halogen content of from 50 to 88% by weight are used.

5. Polyurethane elastomers as claimed in claim 2, characterized in that polybromodiphenyls, polybromodiphenyl ethers and/or polybromopolyphenyl ethers are used in a quantity of from 0.3 to 1% by weight.

6. Polyurethane elastomers as claimed in claim 2, characterized in that from 1.5 to 4% by weight of aluminum hydroxide having a particle size of from 2 to 40μ are used.

7. Polyurethane elastomers as claimed in claim 2, characterized in that aromatic phosphoric acid tris-esters are used.

8. Polyurethane elastomers as claimed in claim 2, characterized in that they contain from 5 to 10% by weight of the additive components (B) to (F) and from 95 to 90% by weight of a thermoplastic polyurethane elastomer based on
   (A) an aromatic diisocyanate,
   (B) a polyester and polyether containing two hydroxyl groups and having a molecular weight in the range from 800 to 6000 or mixtures of polyesters and polyethers and
   (C) 1,4-butane diol, 1,6-hexane diol and/or hydroquinone di-$\beta$-hydroxyethyl ether as the diol chain-extending agent, the NCO/OH-equivalent ratio amounting to between 0.90 and 1.1:1 and the molar ratio between components (B) and (C) amounting to between 1:1.5 and 1:8.

9. In a process of extrusion comprising extruding a thermoplastic, the improvement, wherein the thermoplastic is a polyurethane elastomer having improved flame resistance, electrical surface properties and abrasion resistance by the addition of flameproofing agents and fillers, characterized in that
   (A) from 2.5 to 24% by weight of a combination of additives are incorporated into a thermoplastic polyurethane elastomer, said additives being present in amounts of
   (B) from 1 to 10% by weght of antimony trioxide,
   (C) from 0.3 to 6% by weight of chlorinated or brominated compounds having a halogen content of from 50 to 88% by weight,
   (D) from 1 to 8% by weight of aluminium hydroxide having a particle size of from 0.1 to 100μ,
   (E) from 0.2 to 4% by weight of phosphoric acid tris-ester and
   (F) up to 5% by weight of quaternary tetra-alkyl ammonium salts,
   all of said percents being based on the total weight of the elastomer and additives, are added to the thermoplastic polyurethane elastomer before, during or after the polyurethane-forming reaction and wherein the extrusion temperature of the thermoplastic is kept at temperatures $\leq 200°$ C.

10. The process of claim 1 wherein said additives are added to said thermoplastic polyurethane elastomers in the form of an additive concentrate, said concentrate containing said additives in a quantity of from 25 to 75% by weight.

* * * * *